(12) United States Patent
Reddy

(10) Patent No.: US 6,336,505 B1
(45) Date of Patent: *Jan. 8, 2002

(54) CEMENTING CASING STRINGS IN DEEP WATER OFFSHORE WELLS

(75) Inventor: Baireddy R. Reddy, Duncan, OK (US)

(73) Assignee: Halliburton Energy Services, Inc., Duncan, OK (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/353,676

(22) Filed: Jul. 15, 1999

(51) Int. Cl.$^7$ ................................................ E21B 33/14
(52) U.S. Cl. ....................... 166/293; 106/725; 106/727; 106/820; 166/309; 507/202
(58) Field of Search ................................. 166/293, 309; 106/725, 727, 808, 809, 820; 507/202

(56) References Cited

U.S. PATENT DOCUMENTS

| | | | |
|---|---|---|---|
| 3,359,225 A | 12/1967 | Welsend | |
| 3,844,351 A | * 10/1974 | Sutton et al. | 166/293 |
| 3,937,282 A | 2/1976 | Shryock et al. | 166/293 |
| 4,028,125 A | * 6/1977 | Martin | 106/725 X |
| 4,160,674 A | 7/1979 | Sawyer | |
| 4,304,298 A | * 12/1981 | Sutton | 166/293 |
| 4,415,366 A | * 11/1983 | Copening | 166/293 X |
| 4,466,833 A | * 8/1984 | Spangle | 166/293 X |
| 4,482,379 A | * 11/1984 | Dibrell et al. | 166/293 X |
| 4,557,763 A | 12/1985 | George et al. | |
| 4,676,832 A | 6/1987 | Childs et al. | |
| 4,761,183 A | 8/1988 | Clarke | |
| 5,049,288 A | 9/1991 | Brothers et al. | |
| 5,071,484 A | 12/1991 | Bonifay et al. | 106/692 |
| 5,086,850 A | 2/1992 | Harris et al. | 175/61 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,133,409 A | 7/1992 | Bour et al. | 166/293 |
| 5,340,860 A | 8/1994 | Brake et al. | 524/166 |
| 5,346,550 A | 9/1994 | Kunzi et al. | 106/709 |
| 5,447,198 A | 9/1995 | Kunzi et al. | 166/293 |
| 5,484,019 A | 1/1996 | Griffith | 166/293 |
| 5,571,318 A | 11/1996 | Griffith et al. | 106/725 |
| 5,588,489 A | * 12/1996 | Chatterji et al. | 166/293 |
| 5,688,844 A | * 11/1997 | Chatterji et al. | 166/293 X |
| 5,711,801 A | 1/1998 | Chatterji et al. | 106/789 |
| 5,806,594 A | 9/1998 | Stiles et al. | 166/293 |
| 5,820,670 A | * 10/1998 | Chatterji et al. | 106/820 X |
| 5,897,699 A | 4/1999 | Chatterji et al. | 106/678 |
| 6,063,738 A | * 5/2000 | Chatterji et al. | 166/293 X |
| 6,145,591 A | * 11/2000 | Boncan et al. | 166/293 X |

FOREIGN PATENT DOCUMENTS

| | | |
|---|---|---|
| EP | 0 204 370 A1 | 12/1986 |
| EP | 0 816 300 A2 | 1/1998 |

OTHER PUBLICATIONS

Smith, Dwight K., textbook entitled "Cementing," Chapter 3, Cementing Additives, pp. 18–20 (1990).

* cited by examiner

Primary Examiner—George Suchfield
(74) Attorney, Agent, or Firm—Craig W. Roddy

(57) ABSTRACT

The present invention provides improved methods of cementing casing strings in deep water offshore formations penetrated by well bores. The methods are basically comprised of the steps of preparing a cement composition comprised of hydraulic cement, water, gas, a mixture of foaming and foam stabilizing surfactants, a cement early strength accelerator and a mildly set retarding cement dispersing agent, placing the cement composition in the annulus between the casing string and the well bore and allowing the cement composition to set into a hard impermeable mass.

36 Claims, No Drawings

CEMENTING CASING STRINGS IN DEEP WATER OFFSHORE WELLS

BACKGROUND OF THE INVENTION

1. Field of the Invention

The present invention relates to methods of cementing casing strings in well bores, and more particularly, to methods of cementing conductor or surface casing strings in deep water offshore wells.

2. Description of the Prior Art

In carrying out completion operations in oil and gas wells, hydraulic cement compositions are commonly utilized. For example, hydraulic cement compositions are used in primary cementing operations whereby casing strings are cemented in well bores. That is, a hydraulic cement composition is pumped into the annular space between the walls of a well bore and the exterior of a casing string disposed therein. The cement composition is permitted to set in the annular space thereby forming an annular sheath of hardened impermeable cement therein. The objective of the cement sheath is to physically support and position the casing string in the well bore and bond the casing string to the walls of the well bore whereby the undesirable migration of fluids between zones or formations penetrated by the well bore is prevented.

Primary cementing operations in deep water offshore wells are particularly difficult in that they are carried out in well bores which penetrate formations between the sea floor or mud line and a depth generally under about 2,000 feet below the mud line. Such formations are not well consolidated, readily fracture and often have highly pressured water flows therethrough. For example, the fracture gradients in subsea well bores in which conductor and/or surface casing strings are cemented limit the densities of the cement compositions utilized to 11 or 12 pounds per gallon. The high water flows through the well bores often wash away cement compositions which have densities below 10 to 11 pounds per gallon.

Another problem involved in deep water offshore well cementing is the temperature at which the cement composition must set. Deep water offshore wells typically have sea bottom temperatures ranging from about 32° F. to 55° F. depending on the geographical location. The cement compositions utilized for performing cementing operations at such temperatures must set and provide enough compressive strength to proceed with drilling without involving long waiting-on-cement (WOC) times, preferably less than 24 hours. Accordingly, the cement compositions must include set and strength accelerating agents to allow the cement compositions to set at the low temperatures involved and develop early compressive strengths. However, a problem in the use of set and strength accelerating agents is that they often cause the cement compositions to have thickening times which are too short to allow placement of the cement compositions in the formations or zones to be cemented. Thus, the cement compositions used in deep offshore wells must have adequate pumping times to allow placement, but at the same time they must set and develop sufficient compressive strengths to allow further drilling as quickly as possible. The generally accepted requirements for cement compositions to overcome the above described problems in the Gulf Coast region of the United States include cement composition densities in the range of from 10 to 12 pounds per gallon, thickening times of from 3 to 5 hours and compressive strengths of from 400 to 600 psi at temperatures of from about 45° F. to about 55° F.

Foamed cement compositions have heretofore been utilized in deep water offshore wells to obtain the low densities required. Set and strength accelerating agents such as calcium chloride have also been used to provide short thickening times at the low temperatures involved. To obtain the required compressive strengths at the low temperatures, cement blends containing at least two different cements have heretofore been used. For example, U.S. Pat. No. 5,571,318 issued to Griffith et al. on Nov. 5, 1996 discloses cementing compositions for use in cold environments which are comprised of a relatively coarse particulate hydraulic cement mixed with an ultra fine particulate hydraulic cement. U.S. Pat. No. 5,806,594 issued to Stiles et al. on Sep. 15, 1998 discloses foamed cement compositions containing calcium sulfate cement and Portland cement.

API oil well cements are generally used in deep water offshore wells, and frequently, different classes of such cements must be used for cementing at different depths due to the temperature differences. The use of two or more different cements, for whatever purpose in drilling an offshore well, requires multiple cleanings of the bulk cement tanks located at the drilling rig platform as well as numerous trips to on-shore blending facilities for transporting the different cements to the platform. Thus, there is a need for a cement composition containing a single cement which can be used for cementing at various depths in an offshore well. The use of such a cement composition would be highly economical as well as environmentally preferable.

Another problem associated with offshore wells involves the use of dry additives such as set and compressive strength accelerating agents, set retarders, dispersing agents and the like in the cement compositions used. The use of dry additives requires the cement to be dry blended with the dry additives on-shore and the resulting blend to be transferred to the offshore platform where the dry blend is mixed with seawater. The blends can generally be used only for cementing at certain depths due to the differences in temperatures, fracture gradients and water flows. As a result, unused portions of specific cement blends have to be discarded and replaced with newly prepared blends. Again, this procedure wastes time and money in that it involves additional trips between the on-shore blending facility and the drilling platform, etc.

Thus, if only one basic cement is utilized and if the various additives are added in liquid form to the mix water or slurry on the offshore platform just prior to cementing, the bulk-cement inventory will be limited to one dry cement on the platform that can be used throughout the completion of the well, decisions on the precise nature of the cement composition to be used can be deferred until it is time to begin the cementing process and the operator will use only as much cement and liquid additives needed without generating costly waste and lost time.

SUMMARY OF THE INVENTION

The present invention provides improved methods of cementing casing strings in deep water offshore formations penetrated by well bores which meet the needs described above and overcome the deficiencies of the prior art. The methods of the invention basically comprise the steps of preparing a cement composition comprised of a single hydraulic cement, mix water, a gas for foaming the composition, a mixture of foaming and foam stabilizing surfactants, a cement set and strength accelerating agent and a mildly set retarding cement dispersing agent; placing the cement composition in the annulus between a casing string and a well bore; and allowing the cement composition to set into a hard impermeable mass.

The set and strength accelerating agent and the mildly set retarding dispersing agent are present in the cement composition in a weight ratio and in an amount such that the cement composition has a thickening time in the range of from about 3 to about 5 hours and develops a compressive strength above about 400 psi at a temperature in the range of from about 45° F. to about 55° F. within 24 hours.

The preferred set and strength accelerating agent is calcium chloride and the preferred mildly set retarding cement dispersing agent is sulfonated naphthalene formaldehyde condensate. Generally, these components are varied in the cement composition in a weight ratio from about 1:1 to about 3:1 in order to obtain the required thickening time at the temperature of the subterranean zone in which a casing string is to be cemented.

With the exception of the cement and the gas utilized to foam the cement composition, all of the other components of the cement composition can be in liquid form.

It is, therefore, a general object of the present invention to provide an improved method of cementing casing strings in deep water offshore wells.

A further object of the present invention is the provision of methods of cementing casing strings in deep water offshore wells utilizing a cement composition comprised of a single hydraulic cement, mix water and other additives which can all be added to the mix water or cement slurry in liquid form.

Other and further objects, features and advantages of the present invention will be readily apparent to those skilled in the art upon a reading of the description of preferred embodiments which follows.

DESCRIPTION OF PREFERRED EMBODIMENTS

The present invention provides an improved method of cementing a casing string in a deep water offshore formation or zone penetrated by a well bore using a cement composition comprised of a single hydraulic cement and other components which can all be added to the mix water or cement slurry in liquid form. The cement compositions of this invention can be utilized over a broad temperature range, e.g., from about 32° F. to about 80° F. by simply changing the weight ratio and quantities of certain of the components in the composition. Further, the cement composition can meet the generally accepted requirements for cementing casing strings in deep water offshore wells, namely, a cement composition density in the range of from 10 to 12 pounds per gallon, a thickening time of from 3 to 5 hours and compressive strengths of from 400 psi to 600 psi at 45° F. to 55° F.. The methods allow the operator of an offshore platform to keep a single dry cement in bulk storage on the platform along with the other components of the cement composition which except for the gas utilized to foam the composition can all be in liquid form. The liquid components can be added to the single cement just prior to cementing whereby the operator uses only as much dry cement and liquid components as are needed without generating waste and losing time by changing cements, etc.

As mentioned, the methods of the present invention are particularly suitable for cementing conductor and/or surface casing strings in deep water offshore formations or zones penetrated by well bores. The cement composition of the invention can be used in shallow high water flow formations in which conductor and/or surface casing strings are cemented as well as in the deeper, warmer formations in which other casing strings or liners are cemented. Generally, the cementing composition of this invention can be utilized for cementing wells at depths from 0 to 8,000 feet and deeper.

The improved methods of this invention for cementing a casing string in a deep water offshore formation or zone penetrated by a well bore are basically comprised of the following steps. A cement composition is prepared comprised of a single hydraulic cement, sufficient water to form a pumpable slurry, a gas present in an amount sufficient to form a foam, a mildly set retarding mixture of cement composition foaming and foam stabilizing surfactants present in an effective amount, a cement set and strength accelerating agent and a mildly set retarding cement dispersing agent. The cement set and strength accelerating agent and the mildly set retarding cement dispersing agent are present in a weight ratio and in an amount such that the cement composition has a required thickening time, generally in the range of from about 3 to about 5 hours, and develops adequate compressive strength, generally in the range of from about 400 psi to about 600 psi, at a temperature in the range of from about 45° F. to about 55° F. within a time period of 24 hours or less. Upon being prepared, the cement composition is placed in the annulus between the casing string and the well bore, and the cement composition is allowed to set into a hard impermeable mass therein.

The single hydraulic cement preferred for use in accordance with this invention is API Class H Portland cement which is defined and described in *API Specification For Materials and Testing For Well Cements,* API Specification 10, Fifth Edition, dated Jul. 1, 1990 of the American Petroleum Institute. Other cements which are equivalent to API Class H Portland cement can also be used. As mentioned above, API Class H Portland cement, or other cements which are equivalent thereto, are suitable for cementing deep water offshore wells from 0 to 8,000 feet when used with the other components of the cement composition of this invention.

The water in the cement composition can be fresh water or salt water. The term "salt water" is used herein to mean unsaturated salt solutions and saturated salt solutions including brines and seawater. The water is generally present in the cement composition in an amount sufficient to form a pumpable slurry, and more specifically, in an amount in the range of from about 34% to about 40% by weight of cement in the cement composition.

The gas utilized for foaming the cement composition can be air or nitrogen, with nitrogen being preferred. The gas is present in an amount sufficient to foam the cement composition to a density in the range of from about 10 to about 12 pounds per gallon.

A mildly set retarding mixture of cement composition foaming and foam stabilizing surfactants which is particularly suitable for use in accordance with this invention is comprised of a mixture of an ethoxylated alcohol ether sulfate surfactant of the formula:

wherein a is an integer in the range of from about 6 to about 10 and b is an integer in the range of from about 3 to about 10, an alkyl or alkene amidopropylbetaine surfactant having the formula:

wherein R is a radical selected from the group of decyl, cocoyl, lauryl, cetyl and oleyl and an alkyl or alkene amidopropyl dimethylamine oxide surfactant having the formula:

wherein R is a radical selected from the group of decyl, cocoyl, lauryl, cetyl and oleyl.

The ethoxylated alcohol ether sulfate surfactant is generally present in the mixture in an amount in the range of from about 60 to about 64 parts by weight; the alkyl or alkene amidopropylbetaine surfactant is generally present in the mixture in an amount in the range of from about 30 to about 33 parts by weight; and the alkyl or alkene amidopropyl dimethylamine oxide surfactant is generally present in an amount in the range of from about 3 to about 10 parts by weight. The mixture can be comprised of the surfactants, per se, but more preferably, the mixture includes fresh water in an amount sufficient to dissolve the surfactants whereby it can more easily be combined with the cement composition mixing water or cement slurry.

Another mildly set retarding mixture of foaming and foam stabilizing surfactants which can be utilized is a mixture of the ethoxylated alcohol ether sulfate described above and the alkyl or alkene amidopropylbetaine surfactant described above. This mixture of surfactants is generally comprised of two parts by weight of the ethoxylated alcohol ether sulfate and one part by weight of the alkyl or alkene amidopropylbetaine surfactant. This mixture also preferably includes fresh water in an amount sufficient to dissolve the surfactants.

The mildly set retarding mixture of foaming and foam stabilizing surfactants utilized is generally included in the cement composition of this invention in an amount in the range of from about 0.5% to about 4% by weight of water in the cement composition.

While a variety of cement set and strength accelerating agents can be utilized in the cement compositions of this invention, a water soluble calcium salt such as calcium chloride, calcium nitrite and calcium formate are preferred with calcium chloride being the most preferred. While the set and strength accelerating agent can be utilized directly, it is preferably dissolved in fresh water so that it can be added to the mix water or cement slurry on location. Most preferably, the set and strength accelerating agent is in the form of an aqueous solution wherein the accelerating agent is present therein in an amount of about 33% by weight of the solution.

The mildly set retarding cement dispersing agent is preferably a sulfonated naphthalene formaldehyde condensate which is commercially available from Halliburton Energy Services of Duncan, Okla., under the trade name "CFR-2™."

Another mildly set retarding cement dispersing agent which can be utilized is the condensation product of acetone, formaldehyde and sodium bisulfite which is also commercially available from Halliburton Energy Services of Duncan, Okla., under the trade name of "CFR-3™." Like the cement set and strength accelerating agent described above, the mildly set retarding cement dispersing agent utilized is preferably dissolved in fresh water in an amount of about 33% by weight of the solution.

As mentioned, the ratio of the cement set and strength accelerating agent to the mildly set retarding cement dispersing agent and the amount of the accelerating agent and dispersing agent together in the cement composition can be varied to vary the thickening time and compressive strength of the cement composition at specific temperatures, e.g., a thickening time of from about 3 to about 5 hours and a compressive strength from about 400 psi to about 600 psi at temperatures in the range of from about 45° F. to about 55° F. within 24 hours. Generally, the ratio of the set and strength accelerating agent to the mildly set retarding dispersing agent is varied in the range of from about 1:1 to about 3:1. The amount of the accelerator and dispersing agent together present in the cement composition is generally within the range of from about 1% to about 3% by weight of cement in the composition.

As will be understood by those skilled in the art, in specific applications and at specific depths in deep water offshore wells, other additives, preferably in liquid form, which are well known to those skilled in the art and which do not adversely affect the required properties of the cement composition can be included therein, e.g., a fluid loss control agent and/or a supplemental set retarding agent.

An improved method of the present invention which is particularly suitable for cementing casing strings in deep water offshore formations or zones penetrated by a well bore is comprised of the steps of: (a) preparing a cement composition comprised of a single hydraulic cement, sufficient water to form a pumpable slurry, a gas present in an amount sufficient to form a foam, a mildly set retarding mixture of cement composition foaming and foamed stabilizing surfactants present in an effective amount, a cement set and strength accelerating agent and a mildly set retarding cement dispersing agent, wherein the cement set and strength accelerating agent and the mildly set retarding cement dispersing agent are present in said composition in a weight ratio and in an amount such that the cement composition has a thickening time in the range of from about 3 to about 5 hours and develops compressive strength in the range of from about 400 psi to about 600 psi at a temperature in the range of from about 45° F. to about 55° F. within 24 hours; (b) placing the cement composition in the annulus between the casing and the well bore; and (c) allowing the cement composition to set into a hard impermeable mass therein.

Another method of the present invention for cementing a casing string in a deep water offshore formation penetrated by a well bore at a temperature in the range of from 32° F. to about 80° F. comprises the steps of: (a) preparing a cement composition comprised of API Class H Portland cement, sufficient water to form a pumpable slurry, a gas present in an amount sufficient to form a foam, a mildly set retarding mixture of cement composition foaming and foam stabilizing surfactants present in an effective amount, an aqueous solution of calcium chloride set and strength accelerating agent and an aqueous solution of sulfonated naphthalene formaldehyde condensate dispersing agent, wherein the calcium chloride accelerating agent and sulfonated naphthalene formaldehyde condensate dispersing agent are present in said composition in a weight ratio and in an amount such that the cement composition has a thickening time in the range of from about 3 to about 5 hours and develops a compressive strength of at least about 400 psi within 24 hours; (b) pumping the cement composition into the annulus between the casing and the well bore; and (c) allowing the cement composition to set into a hard impermeable mass therein.

In order to further illustrate the methods and cement compositions of this invention, the following example is given.

EXAMPLE

Test foamed cement compositions of this invention were prepared comprised of API Class H Portland cement, synthetic seawater, air, a mixture of cement composition foaming and foam stabilizing surfactants, an aqueous solution of a cement set and strength accelerating agent and an aqueous solution of a mildly set retarding cement dispersing agent. The identities and quantities of the various components in the test samples are given in the Table below. The test compositions were tested for compressive strengths at 45° F. and 55° F. after curing for 24 hours using Tinius Olsen loading press equipment and for thickening time at 65° F. and 1,000 psi in accordance with the procedures described in the above mentioned API Specification 10. The results of these tests are given in the Table below.

TABLE

Compressive Strength and Thickening Time Tests

| Test Cement Composition No. | Mix Water in Cement Composition, % by weight of cement | Total Water[1] in Cement Composition, % by weight of cement | Mixture of Foaming and Stabilizing Surfactants, % by weight of water | Amount of Set and Strength Accelerating Agent[4], % by weight of cement | Amount of Mildly Set Retarding Dispersing Agent[5], % by weight of cement | Density of Foamed Cement Composition, pounds per gallon | 24 Hour Compressive Strength at 45° F., psi | 24 Hour Compressive Strength at 55° F., psi | Thickening Time at 1000 psi and 65° F., hr:min |
|---|---|---|---|---|---|---|---|---|---|
| 1 | 34 | 37 | 2.25[2] | 3 | 1.5 | 12 | 459 | 535 | 4:54 |
| 2 | 34 | 38 | 2.25[2] | 3 | 2 | 12 | 390 | 580 | 5:40 |
| 3 | 34 | 38 | 2.25[2] | 4 | 1.5 | 12 | 450 | 670 | 5:05 |
| 4 | 34 | 39 | 2.25[2] | 4 | 2 | 12 | 420 | 630 | 4:57 |
| 5 | 34 | 39 | 1[3] | 5 | 2.25 | 12 | 495 | 822 | 4:43 |
| 6 | 33.5 | 40 | 1[3] | 6 | 2.25 | 12 | 489 | 755 | 3:54 |
| 7 | 34 | 38.5 | 1[3] | 4 | 2 | 12 | 345 | 682 | 5:51 |

[1]Water from liquid surfactant mixture and liquid accelerating and dispersing agent solutions included
[2]Ethoxylated alcohol ether sulfate and cocoylamidopropylbetaine
[3]Ethoxylated alcohol ether sulfate, cocoylamidopropylbetaine and cocoylamidopropyl dimethyl amine oxide
[4]33% by weight aqueous solution of calcium chloride
[5]33% by weight aqueous solution of sulfonated naphthalene formaldehyde condensate From the Table it can be seen that the test cement compositions of this invention meet the requirements for cementing in deep water offshore wells.

The present invention is thus well adapted to carry out the objects and attain the benefits and advantages mentioned as well as those which are inherent therein. While numerous changes to the methods can be made by those skilled in the art, such changes are encompassed within the spirit of this invention as defined by the appended claims.

What is claimed is:

1. An improved method of cementing a casing string in a deep water offshore formation penetrated by a well bore comprising the steps of:
    (a) preparing a cement composition comprised of
        a single hydraulic cement;
        sufficient water to form a pumpable slurry;
        a gas present in an amount sufficient to form a foam;
        a mildly set retarding mixture of cement composition foaming and foam stabilizing surfactants present in an effective amount;
        a cement set and strength accelerating agent; and
        a mildly set retarding cement dispersing agent;
        wherein said cement set and strength accelerating agent and said mildly set retarding cement dispersing agent are present in said composition in a weight ratio and an amount such that said cement composition has a thickening time in the range of from about 3 to about 5 hours and develops a compressive strength in the range of from about 400 psi to about 600 psi at a temperature in the range of from about 45° F. to about 55° F. within 24 hours;
    (b) placing said cement composition in the annulus between said casing and said well bore; and
    (c) allowing said cement composition to set into a hard impermeable mass therein.

2. The method of claim 1 wherein said hydraulic cement in said cement composition is API Class H Portland cement or another cement which is equivalent thereto.

3. The method of claim 1 wherein said water is present in said cement composition in an amount in the range of from about 34% to about 40% by weight of hydraulic cement therein.

4. The method of claim 1 wherein said gas is selected from the group consisting of air and nitrogen.

5. The method of claim 1 wherein said gas is present in said cement composition in an amount sufficient to foam said cement composition and to lower the density thereof to in the range of from about 10 to about 12 pounds per gallon.

6. The method of claim 1 wherein said mildly set retarding mixture of foaming and foam stabilizing surfactants in said cement composition is selected from the group consisting of a mixture of an alcohol ether sulfate ethoxylated with from about 3 to about 10 moles of ethylene oxide and an alkyl or alkene amidopropylbetaine and a mixture of an alcohol ether sulfate ethoxylated with from about 3 to about 10 moles of ethylene oxide, an alkyl or alkene amidopropylbetaine and an alkyl or alkene amidopropyl dimethylamine oxide.

7. The method of claim 6 wherein said mildly set retarding mixture of cement composition foaming and foam stabilizing surfactants is present in an amount in the range of from about 0.5% to about 4% by weight of water in said composition.

8. The method of claim 1 wherein said cement set and strength accelerating agent is selected from the group consisting of calcium chloride, calcium nitrite, calcium formate and other water soluble calcium salts.

9. The method of claim 1 wherein said cement set and strength accelerating agent is added to said cement composition in the form of an aqueous solution wherein said accelerating agent is present therein in an amount of about 33% by weight of said solution.

10. The method of claim 1 wherein said mildly set retarding cement dispersing agent is selected from the group consisting of sulfonated naphthalene formaldehyde condensate and the condensation product of acetone, formaldehyde and sodium bisulfite.

11. The method of claim 10 wherein said mildly set retarding cement dispersing agent is added to said cement composition in the form of an aqueous solution wherein said dispersing agent is present in an amount of about 33% by weight of said solution.

12. The method of claim 1 wherein the weight ratio of said cement set and strength accelerating agent to said mildly set retarding cement dispersing agent in said composition is in the range of from about 1:1 to about 3:1.

13. The method of claim 12 wherein said cement set and strength accelerating agent and said mildly set retarding cement dispersing agent together are present in an amount in the range of from about 1% to about 3% by weight of cement in said composition.

14. The method of claim 1 wherein except for said single hydraulic cement and said gas, each of the components of said cement composition is added to said composition in liquid form.

15. An improved method of cementing a casing string in a deep water offshore formation penetrated by a well bore comprising the steps of:
(a) preparing a cement composition comprised of:
  (i) a single hydraulic cement;
  (ii) sufficient water to form a pumpable slurry;
  (iii) a gas present in an amount sufficient to form a foam;
  (iv) a mildly set retarding mixture of cement composition foaming and foam stabilizing surfactants present in an effective amount;
  (v) a cement set and strength accelerating agent; and
  (vi) a mildly set retarding cement dispersing agent;
(b) varying the ratio of said accelerating agent to said dispersing agent and the combined amount of said accelerating agent and said dispersing agent present in said composition to vary the thickening time and compressive strength of said composition, wherein said cement composition has a thickening time in the range of from about 3 to about 5 hours and develops a compressive strength of at least about 400 psi at a temperature in the range of from about 45° F. to about 55° F. within 24 hours;
(c) placing said cement composition in the annulus between said casing string and said well bore, and
(d) allowing said cement composition to set into a hard impermeable mass therein.

16. The method of claim 15 wherein said hydraulic cement in said cement composition is API Class H Portland cement or another cement which is equivalent thereto.

17. The method of claim 15 wherein said water is present in said cement composition in an amount in the range of from about 34% to about 40% by weight of hydraulic cement therein.

18. The method of claim 15 wherein said gas is selected from the group consisting of air and nitrogen.

19. The method of claim 15 wherein said gas is present in said cement composition in an amount sufficient to foam said cement composition and to lower the density thereof to in the range of from about 10 to about 12 pounds per gallon.

20. The method of claim 15 wherein said mildly set retarding mixture of foaming and foam stabilizing surfactants in said cement composition is selected from the group consisting of a mixture of an alcohol ether sulfate ethoxylated with from about 3 to about 10 moles of ethylene oxide and an alkyl or alkene amidopropylbetaine and a mixture of an alcohol ether sulfate ethoxylated with from about 3 to about 10 moles of ethylene oxide, an alkyl or alkene amidopropylbetaine and an alkyl or alkene amidopropyl dimethylamine oxide.

21. The method of claim 20 wherein said mildly set retarding mixture of cement composition foaming and foam stabilizing surfactants is present in an amount in the range of from about 0.5% to about 4% by weight of water in said composition.

22. The method of claim 15 wherein said cement set and strength accelerating agent is selected from the group consisting of calcium chloride, calcium nitrite, calcium formate and other water soluble calcium salts.

23. The method of claim 15 wherein said cement set and strength accelerating agent is added to said cement composition in the form of an aqueous solution wherein said accelerating agent is present therein in an amount of about 33% by weight of said solution.

24. The method of claim 15 wherein said mildly set retarding cement dispersing agent is selected from the group consisting of sulfonated naphthalene formaldehyde condensate and the condensation product of acetone, formaldehyde and sodium bisulfite.

25. The method of claim 24 wherein said mildly set retarding cement dispersing agent is added to said cement composition in the form of an aqueous solution wherein said dispersing agent is present in an amount of about 33% by weight of said solution.

26. The method of claim 15 wherein the weight ratio of said cement set and strength accelerating agent to said mildly set retarding cement dispersing agent in said composition is in the range of from about 1:1 to about 3:1.

27. The method of claim 26 wherein said cement set and strength accelerating agent and said mildly set retarding cement dispersing agent together are present in an amount in the range of from about 1% to about 3% by weight of cement in said composition.

28. The method of claim 15 wherein except for said single hydraulic cement and said gas, each of the components of said cement composition is added to said cement composition in liquid form.

29. An improved method of cementing a casing string in a deep water offshore formation penetrated by a well bore at a temperature in the range of from about 32° F. to about 80° F. comprising the steps of:
(a) preparing a cement composition comprised of:
  (i) API Class H Portland cement;
  (ii) sufficient water to form a pumpable slurry;
  (iii) a gas present in an amount sufficient to form a foam;
  (iv) an aqueous solution of calcium chloride accelerating agent; and
  (v) an aqueous solution of sulfonated naphthalene formaldehyde condensate dispersing agent;
(b) varying the ratio of said accelerating agent to said dispersing agent and the combined amount of said accelerating agent and said dispersing agent present in said composition to vary the thickening time and compressive strength of the composition, wherein said composition has a thickening time in the range of from about 3 to about 5 hours and develops a compressive strength of at least about 400 psi within 24 hours.

30. The method of claim 29 wherein said water is present in said cement composition in an amount in the range of from about 34% to about 40% by weight of hydraulic cement therein.

31. The method of claim 29 wherein said gas is nitrogen present in said cement composition in an amount sufficient to foam said cement composition and lower the density thereof to in the range of from about 10 to about 12 pounds per gallon.

32. The method of claim 29 wherein said mildly set retarding mixture of foaming and foam stabilizing surfactants in said cement composition is a mixture of an alcohol ether sulfate ethoxylated with from about 3 to about 10 moles of ethylene oxide, cocoylamidopropylbetaine and a cocoylamidopropyldimethyl amine oxide and is present in an amount in the range of from about 0.5% to about 4% by wieght of water in said composition.

33. The method of claim 29 wherein said aqueous solutions of calcium chloride accelerating agent and sulfonated naphthalene formaldehyde condensate dispersing agent are each 33% by weight solutions.

34. The method of claim 29 wherein the weight ratio of said calcium chloride accelerating agent to said sulfonated naphthalene formaldehyde condensate dispersing agent in said cement composition is in the range of from about 1:1 to about 3:1.

35. The method of claim 34 wherein said calcium chloride accelerating agent and said sulfonated naphthalene formaldehyde condensate dispersing agent together are present in an active amount in the range of from about 1% to about 3% by weight of cement in said composition.

36. The method of claim 29 wherein except for said Portland cement and said gas, each of the components of said cement composition are added to said cement composition in liquid form.

* * * * *